United States Patent [19]

Spalding et al.

[11] Patent Number: 5,351,436
[45] Date of Patent: Oct. 4, 1994

[54] FLY SWATTER WITH SOUND EFFECTS

[76] Inventors: Merrick W. Spalding; Kathleen J. Spalding, both of Rt. 2 Box 402, Gainesboro, Tenn. 38562

[21] Appl. No.: 737,363

[22] Filed: Jul. 29, 1991

[51] Int. Cl.$^5$ .............................................. A01M 3/02
[52] U.S. Cl. ...................................................... 43/137
[58] Field of Search ....................... 43/137, 132.1, 112

[56] References Cited

U.S. PATENT DOCUMENTS 2,881,554  4/1959  Laine ..................................... 43/112
5,003,721  4/1991  Underwood ........................ 43/132.1

*Primary Examiner*—Kurt C. Rowan

[57] ABSTRACT

An improved fly swatter including a working end and a handle having a terminal end which is provided with a longitudinally extending cavity in which a sound circuit board is housed. Said sound circuit board emits sound effects and/or tunes when activated by an on-off switch. In the preferred embodiment shown, said sound circuit board has a primary circuit which produces one set of sound effects and/or tunes and a secondary circuit which is activated by an inertia switch when the fly swatter strikes an object, thereby emitting a second set of sound effects and/or tunes. In one alternative embodiment illustrated, tile sound circuit board contains only one circuit which produces sound effects and/or tunes when activated by an on-off switch.

7 Claims, 5 Drawing Sheets

FLY SWATTER WITH SOUND EFFECTS

FIELD OF THE INVENTION

This invention relates to fly swatters and, more particularly, to a fly swatter that produces electronically synthesized sound effects and/or tunes.

BACKGROUND OF THE INVENTION

In the past the elimination of unwanted insects in the environment has been a task or duty.

This invention is of a fly swatter which contains electronics, the purpose of which is to produce amusing sounds and/or tunes while in use. This adds an element of amusement to the task of pest elimination and therefore is an improved fly swatter as is set forth mope fully hereinafter.

SUMMARY OF THE INVENTION

This invention is composed of a fly swatter in one embodiment shown which has an elongate handle of rigid plastic material with a working end and a terminal handle end which is provided with a longitudinally extending cavity that is sized to receive a circuit board and power supply necessary to produce sound effects and/or tunes.

OBJECTS OF THE INVENTION

It is an object of this invention to provide a fly swatter with electronically synthesized sound effects and/or tunes which is composed of a small number of parts and which may be of molded plastic material including a handle for the fly swatter which includes a longitudinally extended cavity that is sized to receive the necessary electronics which are provided by a circuit board and battery.

It is accordingly a general object of this invention to provide an improved fly swatter of the type described more fully hereinafter and which is shown in the drawings.

In accordance with these and other objects which will become apparent hereinafter, the instant invention will now be described with reference to the accompanying drawings in which:

DESCRIPTION OF THE PREFERRED EMBODIMENT

Figure 2:
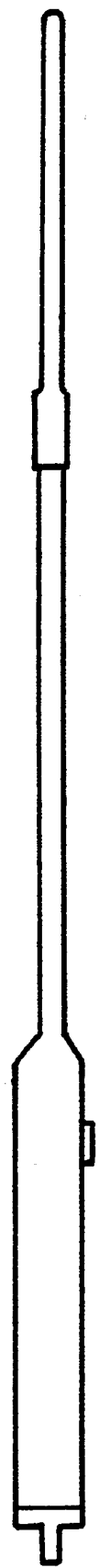
FIG. 2 is a left plan view of FIG. 1.
Figure 1:
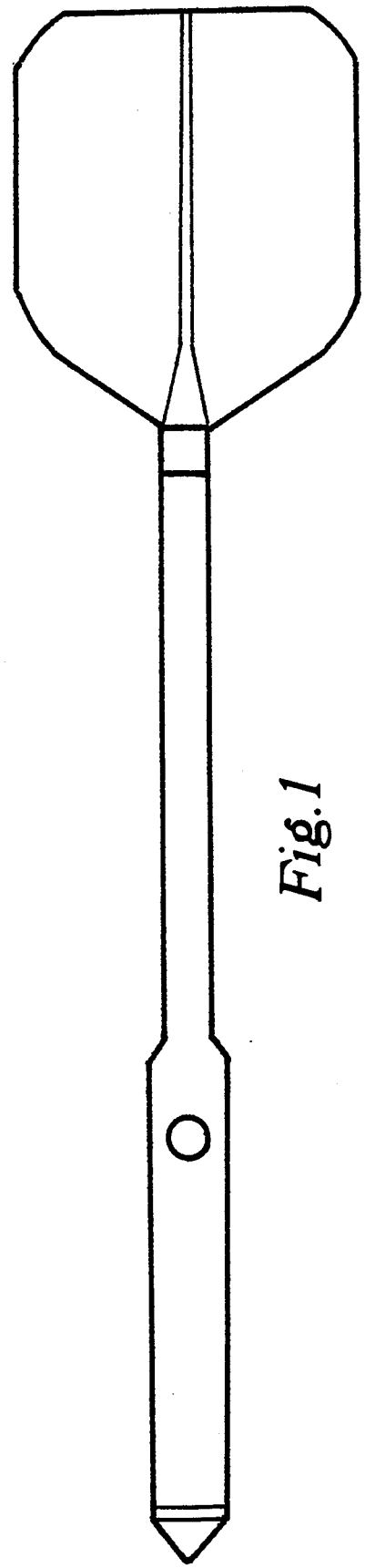
FIG. 1 is a plan view of a fly swatter constructed in accordance with this invention.

Referring to FIGS. 1 through 8 of the drawings where like reference characters designate like or corresponding parts throughout several views and referring to FIG. 1, the numeral 12 generally designates a fly swatter having a conventional working end 7 and a handle 15 having a terminal end cap 26, said handle being elongated and hollow and preferably of molded plastic material which is relatively rigid. The terminal distal end of the handle 15 includes an internal cavity generally designated by the numeral 14 in which the circuit board 18 is housed.

Circuit board 18 is secured inside handle 15 by placing said circuit board into internal cavity 14 so that spring loaded push button 9 of circuit board aligns with hole 8 of handle 15 and spacers 22, 23 and 24 of said circuit board align with holes 27, 28 and 29 of said handle. Flat head, self tapping screws 19, 20 and 21 then fasten through holes 27, 28 and 29 of handle 15 into spaces 22, 23 and 24 of circuit board 18 thereby securing said circuit board to said handle.

Figure 3:
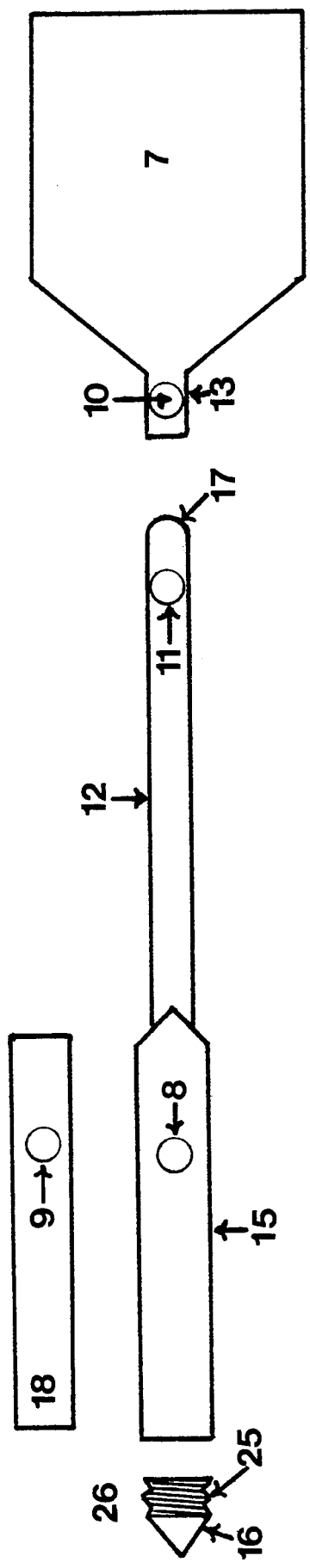
FIG. 3 is an exploded view of FIG. 1, including a circuit board which is housed inside the hand le of FIG. 1.
Figure 4:
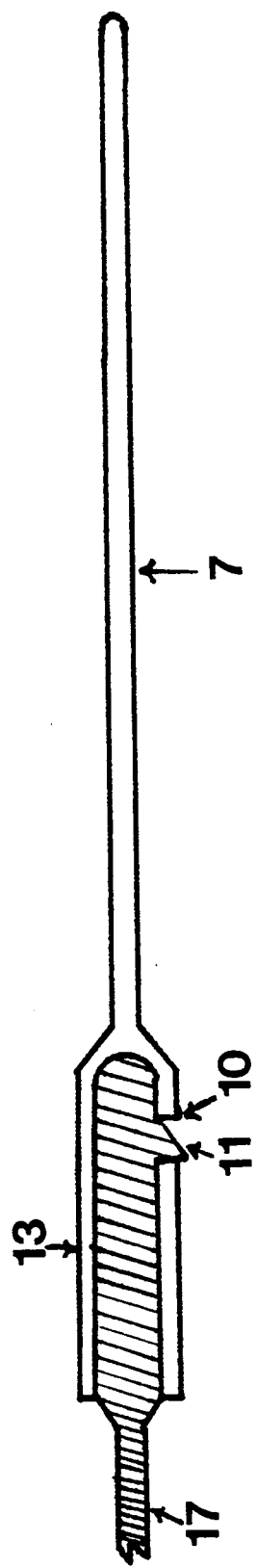
FIG. 4 is a left hand view in cross section of the working end of FIG. 1.
Figure 6:
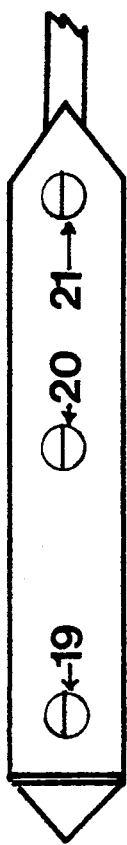
FIG. 6 is a backside view of the handle of FIG. 1.

Referring to FIGS. 3 and 4 when handle receiving end 17 is inserted into hollow section 13 of working end 7, a raised teat 11 is provided on handle receiving end 17 which when aligned with hole 10 of hollow section 13 of working end 7 thereby secures working end 7 to handle receiving end 17. In the preferred embodiment the working end is of flexible plastic material and is conventional in design.

Figure 5:
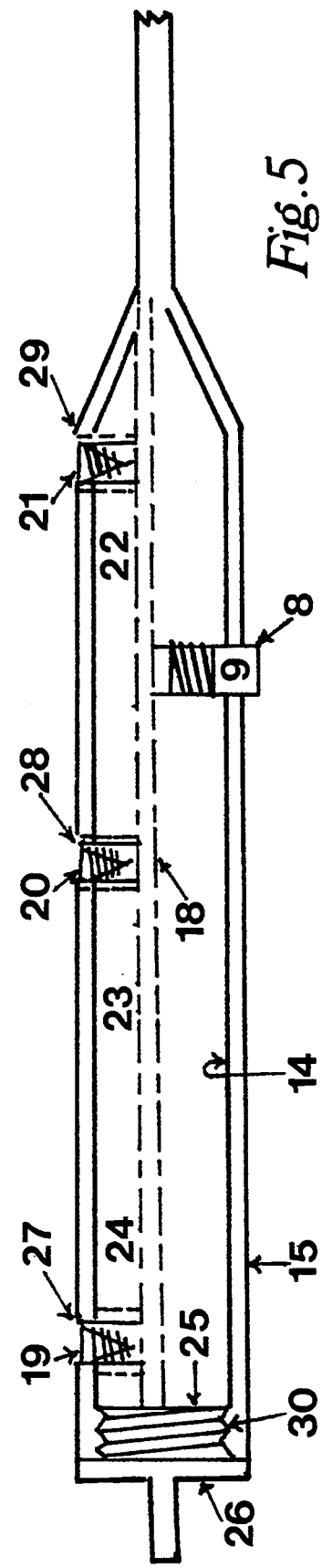
FIG. 5 is a left hand view in cross section of the handle of FIG. 1.
Figure 7:
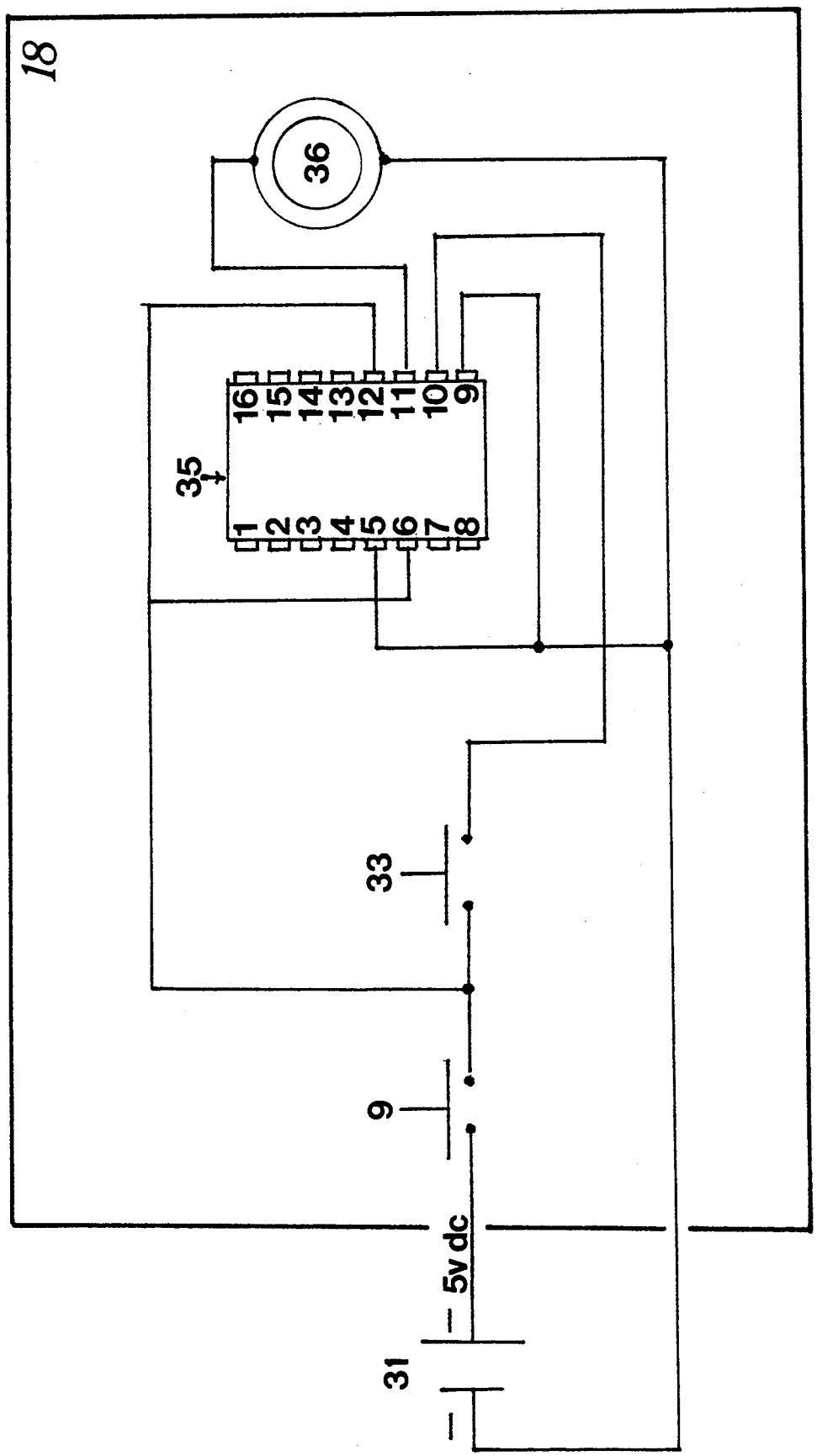
FIG. 7 is a simple electronic schematic of the electronic components necessary to provide the sound effects and/or tunes of the instant invention.

Referring to FIGS. 3 and 5 it is shown that terminal end cap 26 is secured to handle 15 by threaded section 25 of end cap 26 which threads into handle receiving threads 30 located inside handle cavity 14 at the terminal distal end of handle 15. Also shown is protruding terminal end 16 of end cap 26 which by means of a triangular hole provides a means of hanging fly swatter 12 for convenient storage. In the preferred embodiment the end cap 26 is of the same rigid plastic material as the handle 15. Referring to FIG. 7, push button 9, tone generator 35, piezo electric speaker 36 and inertia switch 33 are mounted on printed circuit board 18.

Referring to FIG. 7, a lead is taken from the positive side of 5 volt battery 31 to pushbutton 9. A lead from pushbutton 9 goes to inertia switch 33, to the INIT pin #6 of tone generator 35. (Texas Instruments' model TSP50C10/11 is being used as an example of a tone generator in this drawing.) This sets the counter to zero. A lead is also taken to pin #12 (VDD) of tone generator 35 to provide power to said tone generator 35. This causes the first set of sound effects and/or tune to occur when pushbutton 9 is pressed (closed), driven by a lead from pin #11 (DA1) on tone generator 35 to piezo electric speaker 36. The other lead on piezo electric speaker 36 is connected to the negative pole of the 5 volt battery 31. The negative pole of 5 volt battery 31 is also connected to pin #5 (VSS) on tone generator 35 to provide the ground for tone generator 35, and connected to pin 59 (PBO) of tone generator 35 to provide a low signal to the two bit bidirectional I/O port. When the fly swatter strikes an object inertia switch 33 is closed, sending a positive 5 volt DC signal to pin #10 (PB1) of tone generator 35, providing a high signal to the two bit bidirectional I/O port. This instructs tone generator 35 to produce a second set of sound effects and/or tunes through piezo electric speaker 36. This sound effect occurs until momentary switch 9 is opened to remove power from the circuit.

While tile instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

While FIG. 7 shows only one switch and tone generator, it is acknowledged that as many on-off switches and tone generator as desired may be used in accordance with the basic principles of this invention.

What is claimed is:

1. An improved fly swatter comprising:
   a working end,
   a handle, the handle being elongate and having a terminal distal end, the terminal distal end having a cavity inwardly extending toward the working end,
   an electronic sound circuit board which is located and secured inside said cavity of said handle and which, when activated, emits sound effects and/or tunes.

2. The device as set forth in claim 1 wherein said handle is of rigid plastic material.

3. The device as set forth in claim 1 wherein said working end is of semi-rigid plastic material.

4. The device as set forth in claim 1 wherein said working end includes a hollow section to enclose receiving end of handle and is secured by a raised teat on receiving end which fits into a hole in the hollow section of said working end.

5. The device as set forth in claim 1 wherein said sound circuit board includes an on-off switch or switches, one or more tone generators, and one or more piezo electric speakers.

6. The device as set forth in claim 1 wherein said sound circuit board is powered by means of one or more batteries.

7. The device as set forth in claim 1 wherein an end cap of rigid plastic material is secured to terminal distal end of said handle by means of a threaded section on said end cap which is rotated into receiving threads located at the terminal distal end of the cavity of said handle.

* * * * *